US007648749B1

(12) United States Patent
Taylor (10) Patent No.: US 7,648,749 B1
(45) Date of Patent: Jan. 19, 2010

(54) ANTI-SLOSH DEVICES FOR DAMPING OSCILLATION OF LIQUIDS IN TANKS

(76) Inventor: Geoffrey L. Taylor, 784 Niagara Street, Winnipeg, Manitoba (CA) R3N 0W3

( * ) Notice: Subject to any disclaimer, the term of this patent is extended or adjusted under 35 U.S.C. 154(b) by 204 days.

(21) Appl. No.: 11/503,746

(22) Filed: Aug. 14, 2006

(51) Int. Cl.
*B65D 90/52* (2006.01)
(52) U.S. Cl. ......................................... 428/98; 220/734
(58) Field of Classification Search .................. 428/98, 428/5; 220/563, 734
See application file for complete search history.

(56) References Cited

U.S. PATENT DOCUMENTS

| 2,841,905 | A | * | 7/1958 | Wanchek | 428/5 |
| 3,922,407 | A | * | 11/1975 | Nimmo et al. | 428/5 |
| 5,890,618 | A | * | 4/1999 | Spickelmire | 220/563 |
| 7,014,080 | B2 | * | 3/2006 | Cheng | 223/46 |
| 2002/0063133 | A1 | * | 5/2002 | Spickelmire et al. | 220/563 |

* cited by examiner

*Primary Examiner*—Alexander Thomas
(74) *Attorney, Agent, or Firm*—William L. Chapin (57) ABSTRACT

An anti-slosh device for attenuating oscillations of liquids in tanks caused by movement of vehicles in which the tank is located comprises an elongated flat, rectangularly, shaped, uniform thickness strip of a liquid impervious material such as polyethylene or polycarbonate which is formed into a string of arcuately curved loops. One embodiment of the device has located at opposite ends thereof spirally-shaped, quasi-helical end loops which form a figure-8 shape, and a center loop disposed obliquely between the end loops. A two-loop version of the device has two end loops but no center loop. The anti-slosh device is used to reduce the duration of undesirable oscillations induced in a liquid in a tank by placing a plurality of the devices in the interior of a tank, as by inserting a plurality of the devices through a fill tube or other access port of the tank. Non-parallel surfaces of the device function as baffles, converting large scale linear motions of liquid in a tank to small scale, energy-dissipating vortices, thus reducing the duration and amplitude of oscillations of liquid in the tank.

26 Claims, 7 Drawing Sheets

ANTI-SLOSH DEVICES FOR DAMPING OSCILLATION OF LIQUIDS IN TANKS

BACKGROUND OF THE INVENTION

A. Field of the Invention

The present invention relates to container tanks used in vehicles such as cars, trucks, planes and boats to contain liquids such as water or fuel, which are to be consumed in transit or delivered by the vehicle. More particularly, the invention relates to devices for decreasing the amplitude and duration of fluid oscillations, i.e., sloshings, of a liquid in a tank, which are induced in response to movements of a vehicle in which the tank is mounted.

B. Description of Background Art

Oscillations of a liquid such as water or fuel contained in a tank mounted in a vehicle such as a car, truck, plane or boat are induced in response to inertial accelerations of the vehicle. The natural or resonant frequency of such oscillations is an inverse function of the internal dimensions of the tank and depends to a lesser extent, upon properties of the liquid such as density and viscosity. Liquid oscillations can produce sloshing sounds which are annoying to people close to a tank, as for example, in smaller boats and personal watercraft. Moreover, in some cases, large values of linear momentum can be transferred to a tank and tank support structure as a result of oscillations of liquid contents of the tank. Such oscillations, or sloshing, can result in fatigue wear and ultimate failure of the tank mounts, and support structure. Even worse, in extreme cases, oscillations of liquid in a vehicle-mounted tank can become so large as to result in loss of steering control and even roll-over of the vehicle. Accordingly, it would be desirable to provide an effective means for damping or attenuating oscillations of fluids within tanks. One method for limiting large scale oscillations of a liquid in a tank consists of partitioning the interior of the tank into a plurality of individual cells which communicate with one another, such as by providing a plurality of baffle members within the tank interior. With this arrangement, energy of oscillating liquid in the tank is dissipated by frictional contact of the liquid with edges of intruding baffle members and/or passageways provided through the baffle members.

Another method for damping fluid oscillations in a tank consists of inserting into the tank through a fill port a plurality of small, hollow spheroidal shell-shaped objects made of a fluid resistant polymer. The spheroidal shells have four relatively large holes formed therethrough, including a first pair of diametrically opposed holes centered on North and South poles of the sphere, and a second pair of diametrically opposed holes centered on equatorial antipodes of the spherical shell. The devices apparently work by converting linear momentum of oscillating fluid within the tank to angular momentum of the devices and vortices within the fluid. Ultimately, dissipative viscous forces between the vortices and surrounding fluid within the tank dissipate the oscillation energy.

A wide variety of other techniques have been disclosed which are intended to dampen to smaller amplitudes and durations undesirable, potentially damaging fluid oscillations or sloshing of liquids contained in tanks mounted on moving vehicles. References disclosing such techniques include:

Conway et al., U.S. Pat. No. 3,400,854, Sep. 10, 1965, Anti-Slosh Media For Fuel Tanks;

Conway et al., U.S. Pat. No. 3,349,953, Oct. 31, 1967, Anti-Slosh Media For Fuel Tanks;

Evensen et al., U.S. Pat. No. 3,443,584, May 13, 1969, Buoyant Anti-Slosh System;

Pollack, U.S. Pat. No. 3,784,050, Jan. 8, 1974, Floating Baffle System For Fuel Tanks;

Stedman et al, U.S. Pat. No. 4,764,408, Aug. 16, 1988, Foam Plastic Baffle For Fluid Containers;

Sasaki et al., U.S. Pat. No. 4,974,743, Dec. 4, 1990, Fuel Tank With Noise Suppressing Arrangement;

Spickelmire, U.S. Pat. No. 5,890,618, Apr. 6, 1999, Liquid Stabilizing Baffle System;

Behr et al., U.S. Pat. No. 6,032,347, Mar. 7, 2000, Tank And Manufacturing Method For The Same;

Evans, U.S. Pat. No. 6,062,417, May 16, 2000, Liquid Storage Tank And Baffle System;

Fenton et al., U.S. Pat. No. 6,415,942, Jul. 9, 2002, Filler Assembly For Automobile Fuel Tank;

Spickelmire et al., U.S. Pat. No. 6,547,090, Apr. 15, 2003, Liquid Stabilizing Baffle;

Bambacigno, U.S. Pat. No. 6,848,472, Feb. 1, 2005, Liquid Stabilizing Deflector Baffle;

Spickelmire et al, U.S. Patent Application No. US2002/0063133, May 30, 2002, Liquid Stabilizer;

Konja, U.S. Patent Application No. US2003/0015537, Jan. 23, 2003, Vehicle Fuel Tank With Fuel Wave Baffle;

Fenton, U.S. Patent Application No. US2004/0159663, Aug. 19, 2004, Fuel Tank And Filler Packet For Dispersing Ballistic Shock;

Krogull, U.S. Patent Application No. US2004/0173616, Sep. 9, 2004, Device For Reducing Sloshing Of Fuel In A Fuel Tank.

The present invention was conceived of to provide an anti-slosh device for damping oscillations of liquids contained in existing tanks of a wide variety of sizes and shapes.

OBJECTS OF THE INVENTION

An object of the present invention is to provide anti-slosh devices for damping oscillations of liquids in tanks, the devices being of an appropriate size and shape to be insertable through a fill tube or other access port into the interior of an existing tank, without requiring modification of the tank.

Another object of the invention is to provide an anti-slosh system which uses a plurality of anti-slosh devices that are insertable into an existing tanks of various sizes in quantities sufficient to occupy a pre-determined volume of the tank.

Another object of the invention is to provide an anti-slosh device which has relatively large-area flow-impeding baffle surfaces that are angled with respect to one another.

Another object of the invention is to provide an anti-slosh device which has a relatively large flow impeding surface area relative to the mass and volume of the device.

Another object of the invention is to provide an anti-slosh device which has a relatively large passageways therethrough which are effective in redirecting large scale motions of fluid in a tank to a plurality of smaller turbulent, energy dissipating paths, but which has a topology that resists interpretation or nesting of adjacent devices.

Another object of the device is to provide an anti-slosh device which is effective in damping oscillations of a liquid in a tank, but which displaces only a small percentage of the volume of the tank.

Another object of the invention is to provide an anti-slosh device which can be fabricated from a single elongated rectangularly-shaped thin sheet made of a plastic such as polycarbonate or high density polyethylene.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a system for attenuating oscillations of a liquid such as water, gasoline, diesel fuel or the like contained in a tank, the oscillations having been induced by motions of a vehicle on which the tank is mounted. An anti-slosh system according to the present invention includes a plurality of identical anti-slosh devices that are insertable through a fill port, outlet tube or other access port into the interior of a tank, before or after the tank has been filled with a liquid. Each anti-slosh device has generally the shape of an elongated, flat, uniform thickness, rectangular strip of a fluid-impervious material such as a polycarbonate plastic, which has been formed into a plurality of non-parallel, arcuately curved loops between ends of the strip.

In a preferred embodiment of the invention, the flat rectangular strip is bent to form three arcuately curved, flat band loops including a pair of opposed outer end loops at opposite longitudinal ends of the device. The end loops each have a spiral shape similar to that of a single turn of a helical band, and the longitudinal pitch axes of the end loops are inclined downwards from a longitudinal connecting axis disposed through the end loops of the device.

A preferred embodiment of an anti-slosh device according to the present invention also includes a center flat loop which has the shape of a vertically flattened, oval ring that has a diameter similar to the diameters of the helical end loops. The center line or rotation axis of the center loop is inclined at an oblique angle, e.g., about 45°, to the longitudinal connecting axis between the end loops.

The anti-slosh device is preferably fabricated by fixing in place a first, starting end portion of a thin, longitudinally elongated, rectangularly-shaped strip of uniform thickness plastic material such as a polycarbonate, and bending a portion of the strip which protrudes obliquely outwardly, e.g., to the left, into a first, left end loop. The end loop has a rear half helical segment which has a forward pitch, and a front half helical segment which has a reverse pitch, thus giving the loop a spiral, quasi-helical shape.

The reverse pitch segment of the first end loop has an extension which protrudes obliquely inwardly and rearwardly, to the right and towards the center of the device, and crosses under the first end portion of the strip at an angle of less than 90 degrees, where it forms a first, upper loop intersection with and is secured to the underside of the starting end portion of the strip. Thus secured, a front longitudinal side edge of the extension portion of the reverse segment is positioned underneath and nearly parallel to a transverse starting edge of the starting portion of the strip. This arrangement results in the first intersection region, which is formed between a starting end portion of the strip and an underlying extension portion of the first, left helical end loop, having a generally rhomboidal shape.

The extension portion of the reverse segment of the first, left helical end loop is disposed obliquely to the right from the centrally located first loop intersection of the device. The extension portion then loops upwardly back to the left and thence underneath and to the right of the first intersection region, thus forming an oval ring-shaped center loop. The lower end of the center loop forms a second, bottom loop intersection region spaced below the first, upper loop intersection region. The center loop has a generally horizontally disposed major axis of larger diameter than the first end loop.

A lower, obliquely rightwardly angled extension portion of the large center loop continues to the right to form a second, right outer end loop similar in shape to the left outer end loop. Thus, the right outer end loop has a positive pitch rear half helical segment which protrudes obliquely rearwards and outwards from the center of the device towards the right, and a front half helical segment which has a reverse pitch. The reverse pitch front segment has an extension which protrudes obliquely inwards to the left and rearwards, i.e., towards the center of the device. The reverse pitch extension terminates in a second, finish end portion of the strip. The finish end portion also has a transverse end which is disposed perpendicularly to the parallel sides of the strip, and is inserted between a lower central portion of the center loop and the inner centrally located end portion of the reverse pitch helical half segment of the left end loop, forming therebetween a third loop intersection.

The four generally rhomboidly-shaped, overlapping regions of the strip located in the center of the device which form the three intersections described above are secured together by suitable means, such as a pair of rivets which extend upwards from the bottom surface of the device comprising the bottom surface of the large center loop, and emerge through the upper surface of the starting end portion of the strip.

The above-described construction of an anti-slosh device according to the present invention has a shape approximating that of a three-dimensional figure-8 bow, which has opposed left and right helical end loops, and an additional oval center loop which is disposed diagonally between left and right end loops of the bow, the three loops having similar diameters. All three loops protrude upwards from a flat horizontal base plane consisting of a bottom center portion of the center loop.

It has been found by the present inventor that anti-slosh devices shaped as described above not only provide efficient baffling action which effectively dampens oscillations of a liquid in a tank into which the devices are inserted, but also resist interpenetrating one another, or "nesting" thus enabling a small number of devices to occupy a sufficiently large percentage of the volume of the tank, e.g. one-half, to collectively provide effective dampening of liquid oscillations in the tank.

DESCRIPTION OF THE PREFERRED EMBODIMENTS

FIGS. 1-12 illustrate anti-slosh devices for damping oscillations of liquid in tanks, according to the present invention.

FIGS. 1-7 illustrate a preferred, three-loop embodiment 20 of an anti-slosh device according to the invention. As shown in those figures, anti-slosh device 20 is preferably formed of a single thin, longitudinally elongated rectangularly-shaped strip 21 which has a uniform thickness and is made of a flexible material that is resistant to degradation by liquids of the type which the device is to be immersed in, e.g., water, gasoline, diesel fuel, etc. The present inventor has found that synthetic polymers such as polycarbonate and high density polyethylene plastics are suitable materials from which to fabricate device 20.

As shown in FIGS. 1-7, anti-slosh device 20 has a shape which can be formed by bending a thin, elongated rectangular strip 21 made of a flexible material such as a polycarbonate or high density polyethylene into a connected sequence of flat loops including a first, e.g., left, end loop 22. Left end loop 22 has a quasi-helical shape, including a positive helix-angle, i.e., positive pitch, rear half segment 23, which is angled obliquely outwardly, i.e., longitudinally outwards to the left and rearwardly in FIGS. 1-3. Left end loop 22 also has extending from rear half segment 23 thereof a negative pitch, front half segment 24 which is disposed obliquely inwardly, or to the right and rearwardly in FIGS. 1-3. Thus, left end loop 22 has a quasi-helical shape, which may be referred to henceforth simply as helical.

Figure 2:
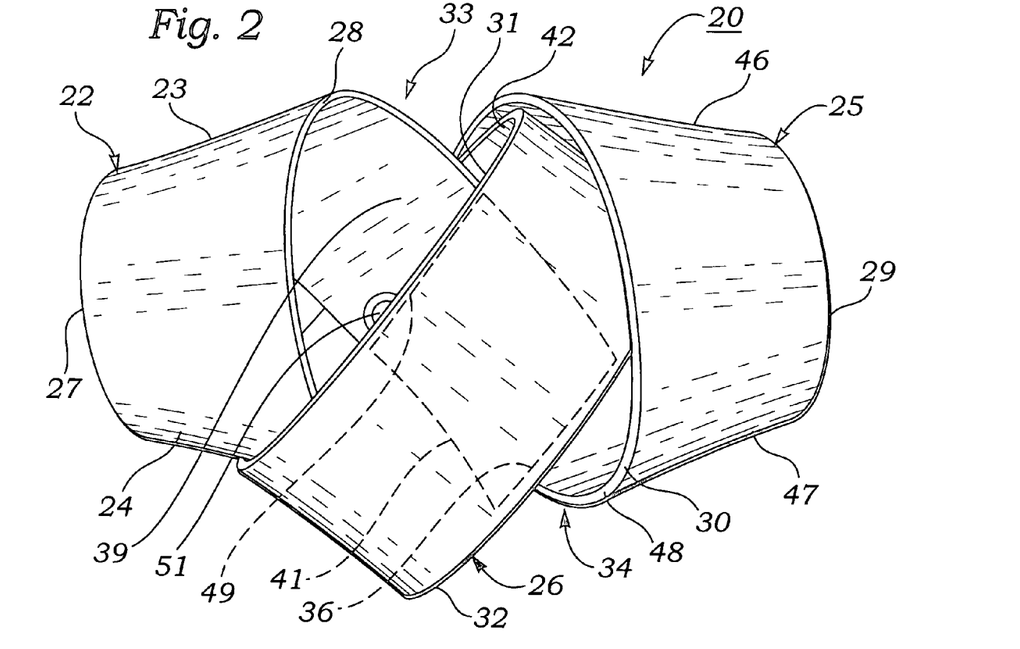
FIG. 2 is an upper plan view of the device of FIG. 1.
Figure 3:
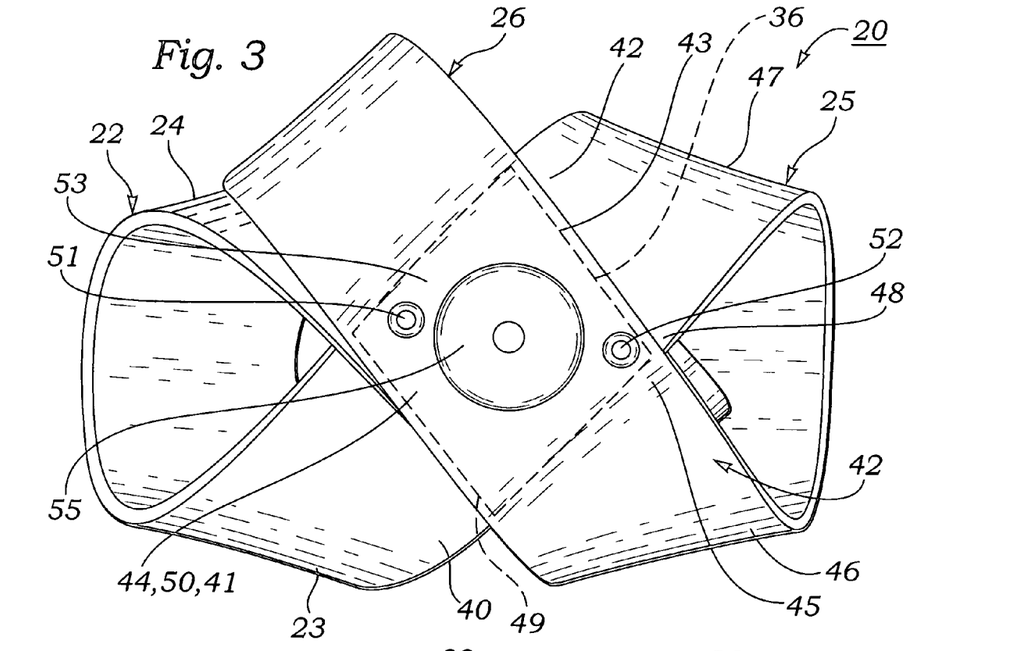
FIG. 3 is a lower plan view of the device of FIG. 1.
Figure 4:
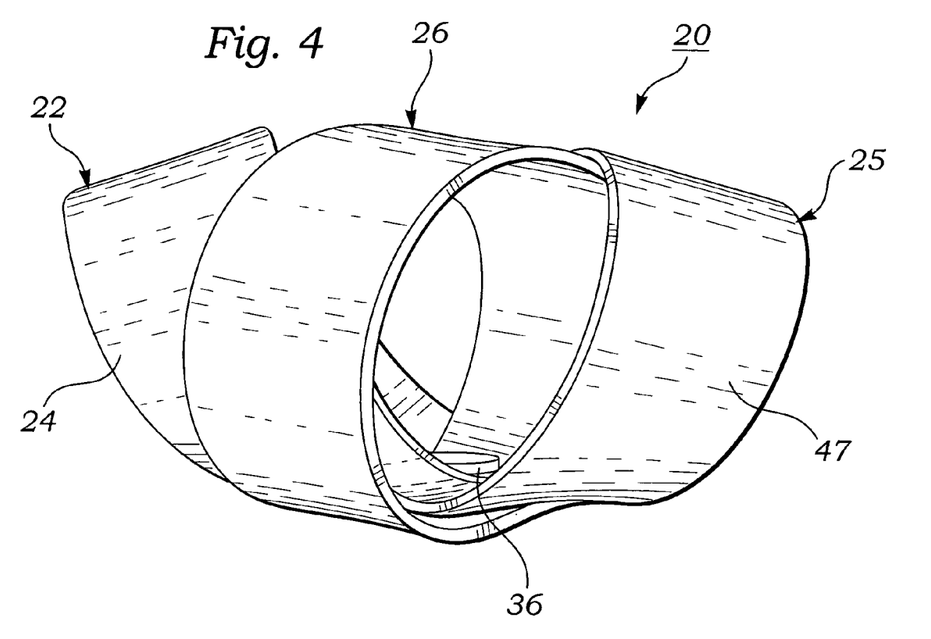
FIG. 4 is a front elevation view of the device of FIG. 1.
Figure 5:
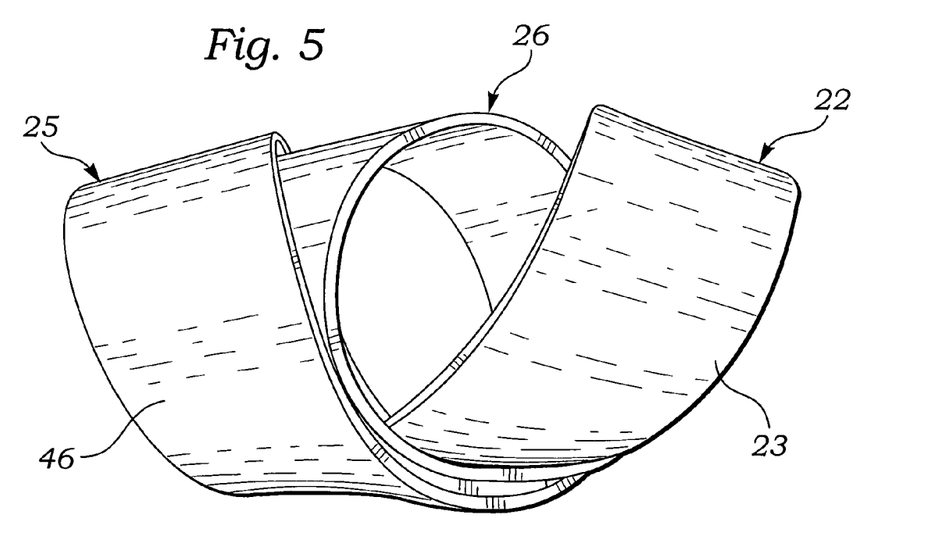
FIG. 5 is a rear elevation view of the device of FIG. 1.
Figure 6:
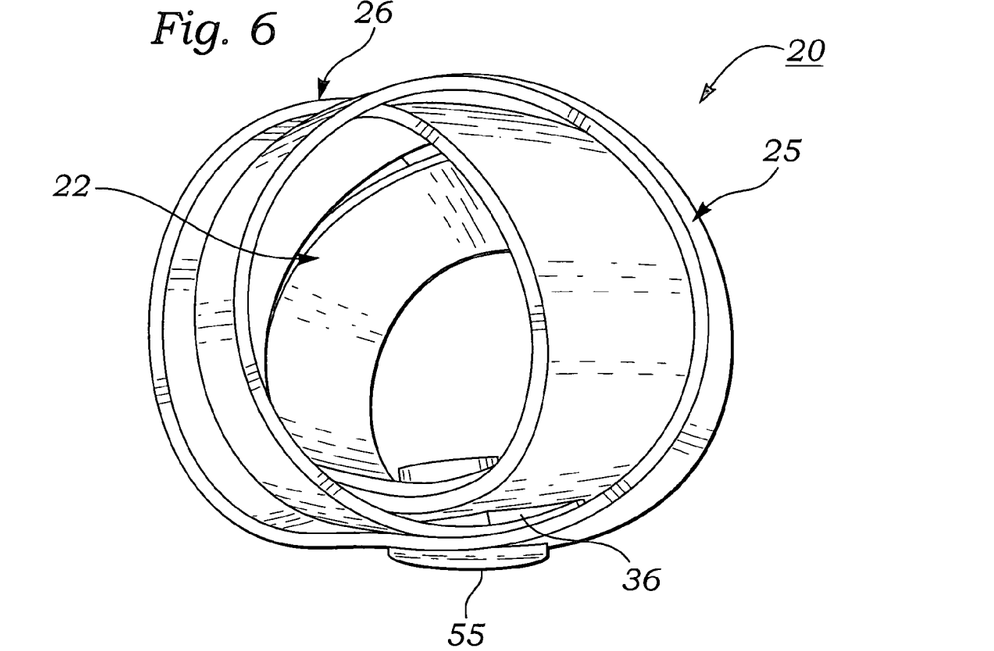
FIG. 6 is a right end elevation view of the device of FIG. 1.
Figure 7:
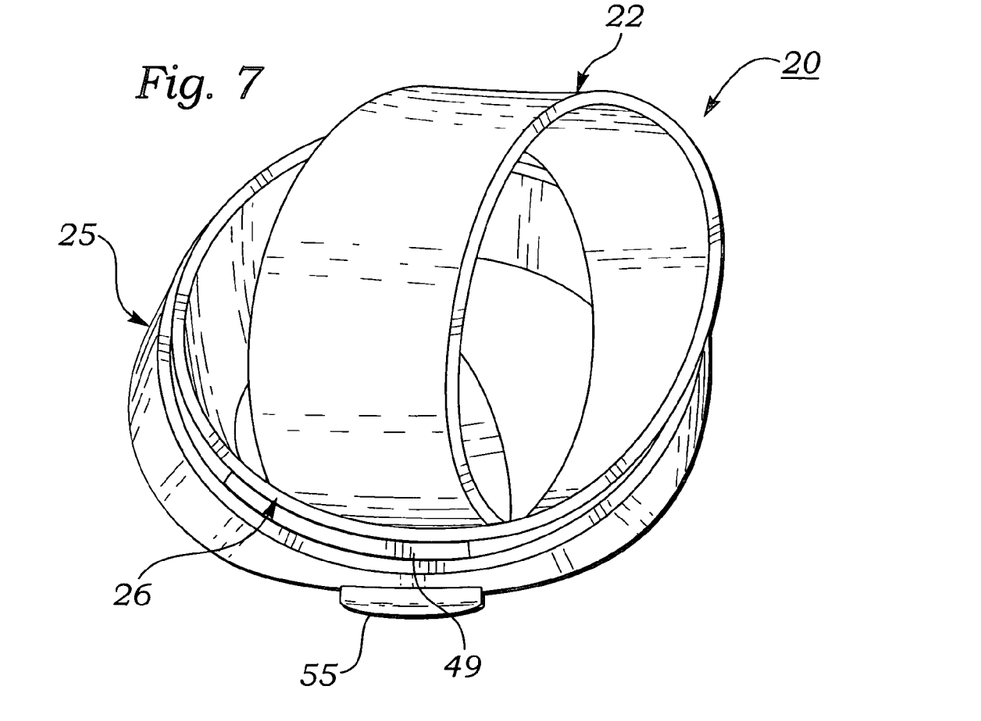
FIG. 7 is a left end elevation view of the device of FIG. 1.
Figure 8:
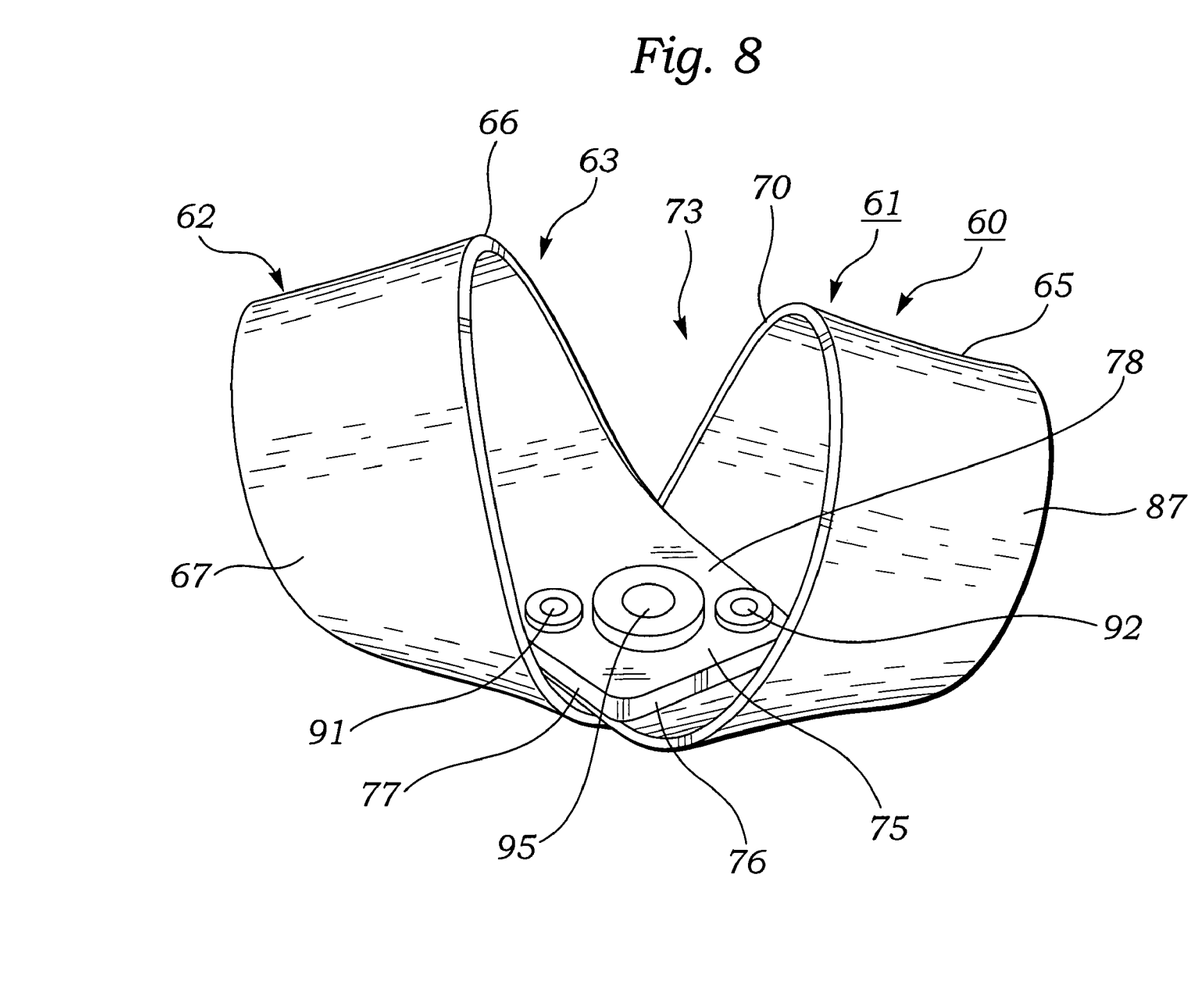
FIG. 8 is an upper front perspective view of a two-loop anti-slosh device according to the present invention.

Device 20 also includes a second, e.g., right, quasi helical end loop 25 which forms with first end loop 22 a shape which in a lower or upper plan view approximates that of a FIG. 8, as shown in FIGS. 2 and 3.

Device 20 also includes a center loop 26 which has a generally oval or elliptical shape that has a horizontal major axis which is disposed obliquely with respect to a longitudinal connecting axis disposed through end loops 22, 25.

As shown in FIG. 2, left end loop 22 has an outer longitudinal edge 27 and a parallel inner longitudinal edge 28. Similarly, right end loop 25 has outer and inner parallel longitudinal edges 29, 30. As is also shown in FIG. 2, obliquely disposed oval center loop 26 has parallel left and right obliquely disposed longitudinal edges 31, 32.

Figure 1:
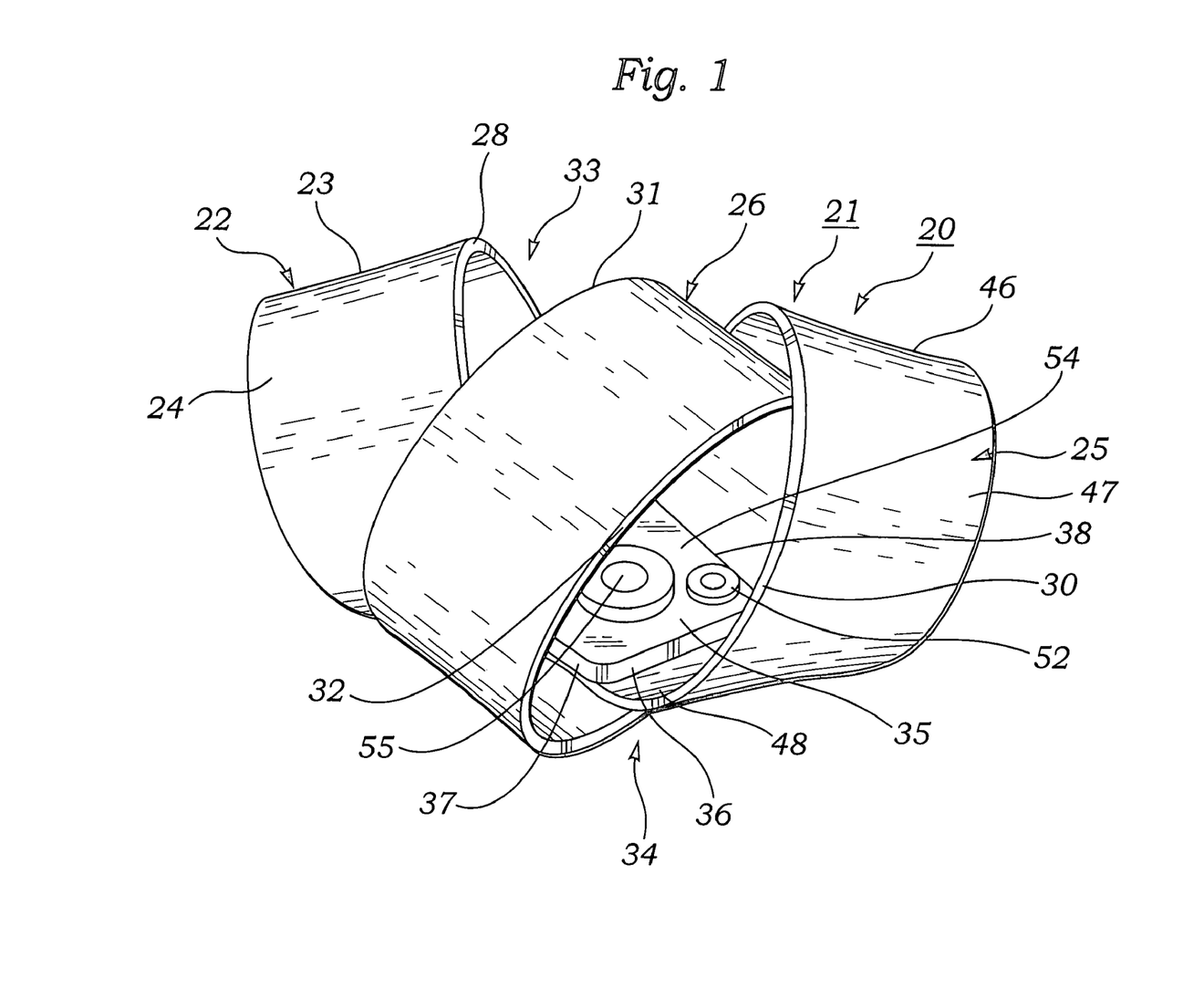
FIG. 1 is an upper front perspective view of a three-loop anti-slosh device according to the present invention.

As shown in FIGS. 1 and 2, the construction of anti-slosh device 20 results in a wedge-shaped left rear opening 33 being formed between inner, right-hand edge 28 of left end loop 22 and oblique left-hand edge 31 of center loop 26. The construction of anti-slosh device 20 also includes a wedge-shaped right front opening 34 being formed between inner, left-hand edge 30 of right end loop 25, and oblique right-hand edge 32 of center loop 26.

The maximum width of each of the openings 33 and 34 is less than the width of strip 21 from which device 20 is fabricated. Thus, when a plurality of devices 20 are inserted into the interior of a tank and allowed to assume random relative orientations within the tank, the topology or geometry of the devices prevents the devices from interpentrating or nesting with each other. Three-loop anti-slosh device 20 may be fabricated from a single elongated rectangularly-shaped strip 21 cut from a thin, uniform thickness sheet of a synthetic polymer such as high density polyethylene or polycarbonate plastic, in the following manner.

Referring to FIGS. 1-7, it may be seen that device 20 can be fabricated from strip 21 by first fixing in place a starting end portion 35 of the strip which has a first edge 36 disposed perpendicularly between front and rear longitudinal sides 37, 38 of the strip. A free portion of strip 21 is then payed out obliquely outwards from first edge 36 and rearwardly to form a positive-pitch, rear half-segment 23 of first, left end loop 22. A portion 40 of strip 21 which extends rearward from the front, reverse-pitch helical half segment 24 of the left end loop 22 is then payed out obliquely inwardly, i.e., to the right and rearwardly in FIGS. 1, 2 and 4, and crossed under starting end portion 35 of strip 21 forming therewith a first, rhomboidly-shaped, top intersection 41. An extension portion 42 of strip 21 disposed obliquely to the right from first, top intersection 41 is looped upwardly and obliquely over the top intersection, thus forming oval ring-shaped center loop 26. A lower portion 43 of center loop 26 forms a second, bottom intersection 44 spaced below the top intersection 41.

An extension 45 of lower portion 43 of oval center loop 26 protrudes obliquely rearwardly and to the right of bottom intersection 44, and is formed into second, right helical end loop 25. Right end loop 25 has a rear positive helix-angle half-segment 46 which protrudes obliquely rearwardly and outwardly to the right with respect to the center of device 20, and a front negative helix-angle half-segment 47 which protrudes obliquely inwardly toward the center of the device. The front negative helix angle half segment 47 has an extension 48 which comprises the finish end portion of strip 21. Finish end portion 48 of strip 21 has a transverse end 49 which is disposed perpendicularly between longitudinal side edges of strip 21.

Finish end portion 48 of strip 21 is inserted between a portion of the strip located in the center of device 20 that comprises the finish portion of left end loop 22 and center loop 26, and lower portion 43 of the center loop, and is secured thereto to form a third, middle intersection 50. The four vertically stacked portions of strip 21 which form the three rhomboidly-shaped intersections as described above, are all secured together by any suitable means. In the example shown in FIGS. 1-7, stacked portions of strip 21 are secured together by a pair of rivets 51, 52, which protrude upwardly from the bottom surface 53 of the device, through the four overlapping segments of the strip, and through the upper surface 54 of starting end portion 35 of the strip. Optionally, a third rivet 55 located between rivets 51, 52 is used to further secure together the four overlapping segments of strip 21.

The effectiveness of anti-slosh devices 20 was tested by the following technique.

A plurality, i.e., 18, of identical devices 20 were each constructed from a separate 11-foot long by 8 inch wide by ⅛-inch thick high-density polyethylene (HDPE) material. Devices 20 were fabricated to have a maximum diameter of 14 inches measured between the front vertex 55 of center loop 26 and rear vertex 56 of right end loop 25, as shown in FIG. 2.

A 300-imperial gallon, horizontally disposed cylindrical tank which had a width of 39 inches and a length of 72 inches was then filled to a level of 18 inches with water. One end of the tank was raised 8 inches, and subsequently dropped, causing water in the tank to slosh with large amplitude oscillations of up to about 1 foot. The sloshing continued for about 8.5 minutes before the amplitude of the oscillations, measured at opposite lateral ends of the tank, was reduced to less than 1 inch of vertical movement.

Next, 18 devices 20 of the construction described above were inserted through a 15-inch diameter fill tube opening into the interior of the tank. Each device 20 utilized a pair of stainless steel fastening bolts through the centers of the device, in place of rivets 51, 52. The end of the tank was again raised 8 inches, and there was no measurable slosh. The end of the tank was then raised to a height of 26 inches, and dropped. With 18 devices 20 present in the tank, the sloshing action of amplitudes greater than 1-inch vertical movement was reduced to a duration of only about 3 seconds.

FIGS. 8-12 illustrate a modification 60 of anti-slosh device 20. Modified anti-slosh device 60 has left and right end loops 62, 65, shaped similarly to end loops 22, 25 of device 20, but does not have a center loop.

As shown in FIGS. 8-14, two-loop anti-slosh device 60 is preferably formed from a single thin, longitudinally elongated rectangularly-shaped strip 61 made of a synthetic polymer having properties substantially the same as those described for strip 21 of three-loop anti-slosh device 20.

As shown in FIGS. 8-14, anti-slosh device 60 has a shape which can be formed by bending a thin, elongated rectangular strip 61 made of a flexible material such as a polycarbonate or high density polyethylene into a connected sequence of flat loops including a first, e.g., left, end loop 62. Left end loop 62 has a quasi-helical shape, including a positive helix-angle, i.e., positive pitch, rear half segment 63, which is angled obliquely outwardly, i.e., longitudinally outwards to the left and rearwardly in FIGS. 4-10. Left end loop 62 also has extending from rear half segment 63 thereof a negative pitch, front half segment 64 which is disposed obliquely inwardly, or to the right and rearwardly in FIGS. 8-10. Thus, left end loop 62 has a quasi-helical shape, which may be referred to henceforth simply as helical.

Figure 9:
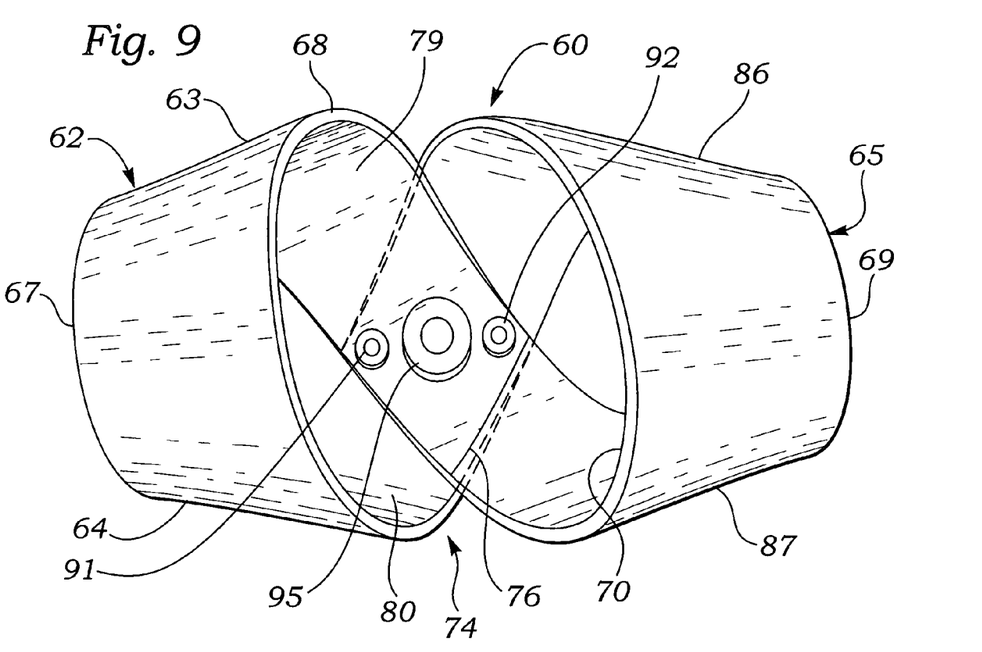
FIG. 9 is an upper plan view of the device of FIG. 8.
Figure 10:
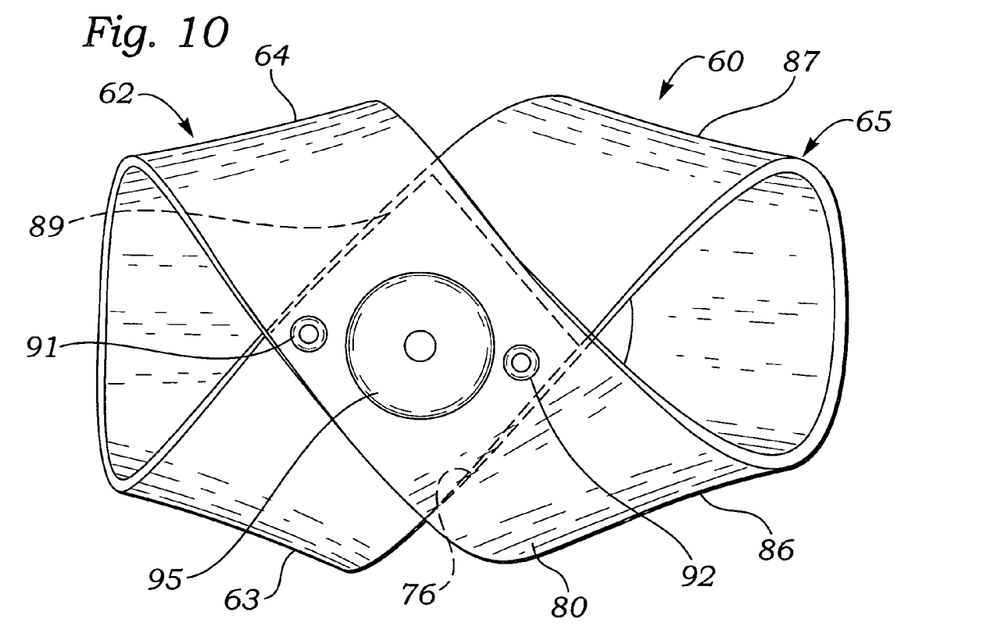
FIG. 10 is a lower plan view of the device of FIG. 8.

Device 60 also has a second, e.g., right, quasi-helical end loop 65 which forms with first end loop 62 a shape in which a lower or upper plan view approximates that of a FIG. 8, as shown in FIGS. 9 and 10.

As shown in FIG. 9, left end loop 62 has an outer longitudinal edge 67 and a parallel inner longitudinal edge 68. Similarly, right end loop 65 has outer and inner parallel longitudinal edges 69, 70.

Figure 11:
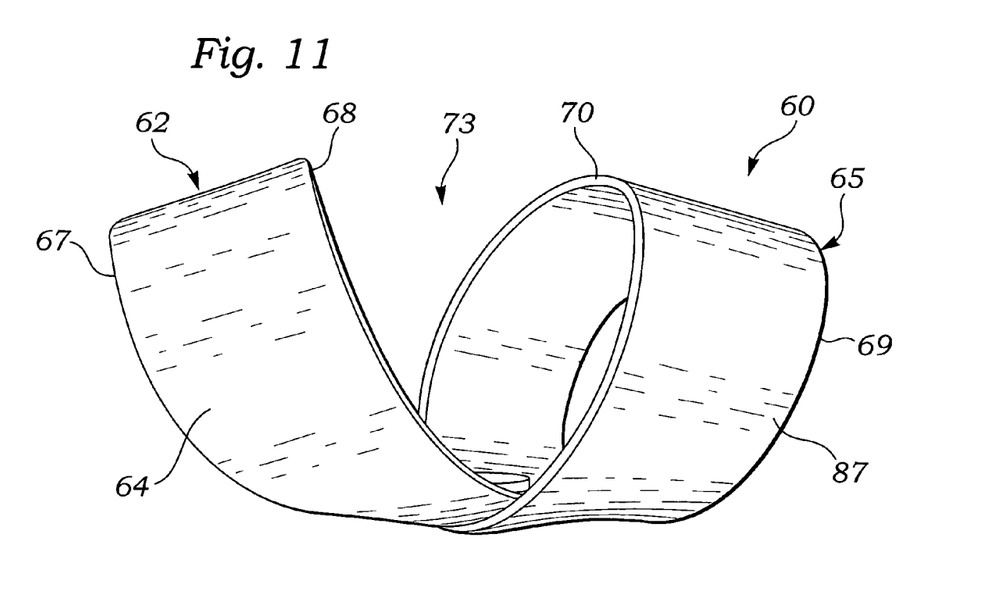
FIG. 11 is a front elevation view of the device of FIG. 8.
Figure 12:
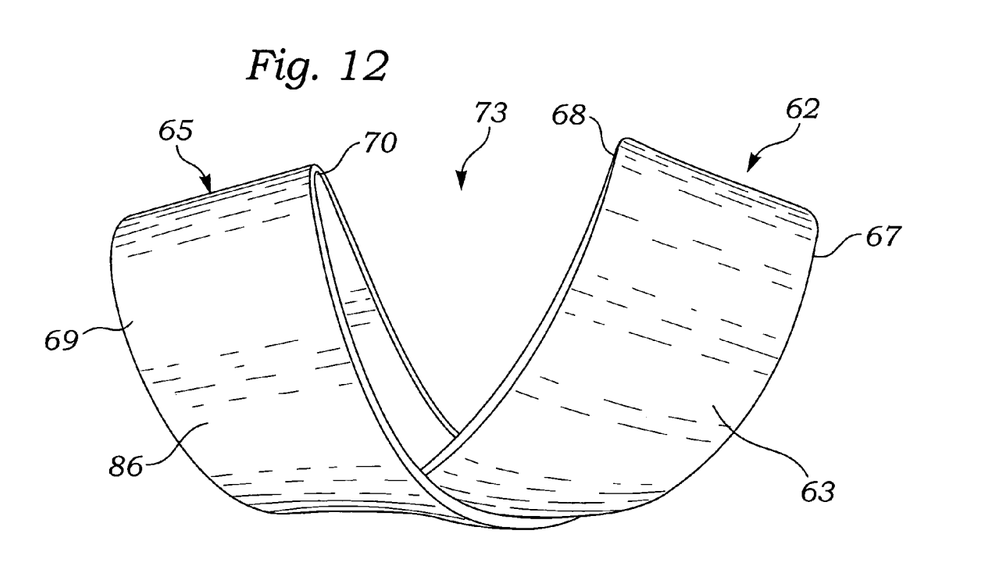
FIG. 12 is a rear elevation plan view of the device of FIG. 8.

As shown in FIGS. 11 and 12, the construction of anti-slosh device 60 results in an opening 73 being formed between inner, right-hand edge 68 of left end loop 62 and inner, left-hand edge 70 of right end loop 65. As shown in those figures, opening 73 has in front and rear elevation views the shape of an inverted, triangular wedge, and in three dimensions, a shape approximating that of a pie-shaped sector of a sphere.

As shown in FIGS. 11 and 12, the lateral width of opening 73 between edges 68 and 70 of left and right end loops 60, 65 decreases towards the bottom of device 60, to a value less than the width of strip 61 from which device 60 is fabricated. Thus, when a plurality of devices 60 are inserted into the interior of a tank and allowed to assume random relative orientations within the tank, the topology or geometry of the devices prevent the devices from fully interpenetrating or nesting with each other.

Two-loop anti-slosh devices 60 may be formed by any convenient method, such as casting, injection molding, or the like. However, device 60 is preferably fabricated from a single elongated rectangularly-shaped strip 61 of a uniformly thick sheet of a synthetic polymer, such as a high-density polyethylene or polycarbinate plastic, in the following manner.

Referring to FIGS. 8-14, it may be seen that device 60 can be fabricated from strip 61 of flexible material by first fixing in place a starting end portion 75 of the strip which has a first edge 76 disposed perpendicularly between front and rear longitudinal sides 77, 78 of the strip. A free portion of strip 61 is then payed out obliquely outwards from first edge 76 and rearwardly to form a positive-pitch, rear half segment 63 of first, left end loop 62. A portion 80 of strip 61 which extends rearward from the front reverse pitch helical half segment 64 of the left end loop 62 is then payed out obliquely inwardly, i.e., to the right and rearwardly in FIGS. 8, 9 and 10 and crossed under starting end portion 65 of strip 61, forming therewith a first, rhomboidly-shaped top intersection 81.

Extension 80 of strip 61 is payed out obliquely rearwardly and to the right of intersection 81, and is formed into a second, right helical end loop 65. Right end loop 65 has a rear positive helix-angle half-segment 86 which protrudes obliquely rearwardly and outwardly to the right with respect to the center of device 60, and a front negative helix-angle half-segment 87 which protrudes obliquely inwardly towards the center of the device. The front negative helix angle half segment 87 has an extension 88 which comprises the finish end portion of strip 61. Finish end portion 88 of strip 61 has a transverse end 89 which is disposed perpendicularly between longitudinal side edges of strip 61.

Finish end portion 88 of strip 61 is inserted between starting end portion 75 and extension 80 of the strip. The three vertically stacked portions of strip 61 which form the two rhomboidly-shaped intersections as described above, are all secured together by any suitable means. In the example shown in FIGS. 8-14, stacked portions of strip 61 are secured together by a pair of rivets 91, 92 which protrude upwardly from the bottom surface 93 of the device, through the three overlapping segments of the strip, and through the upper surface 94 of starting end portion 75 of the strip. Optionally, a third rivet 95 located between rivets 91, 92 is used to further secure together the three overlapping segments of strip 61.

What is claimed is:

1. An anti-slosh device for reducing the duration and amplitude of oscillations of liquid in a tank, said device comprising an elongated thin web formed of an elongated strip of flexible material formed into a three-dimensional shape having a plurality of at least first and second flow impeding baffle surfaces, said strip having a first, starting end portion which is disposed in a first direction from a first, starting end to form a first loop, which is disposed in a second, opposite direction to form a second loop, and has a second, finishing end portion which is disposed back in said first direction and secured to said first, starting end of said strip to thereby form a three-dimensional shape approximating that of a figure eight.

2. The device of claim 1 wherein at least a portion of each baffle surface is non-parallel to a portion of each other baffle surface.

3. The device of claim 2 wherein said first and second baffle surfaces comprise surfaces of a plurality of at least first and second closed loops.

4. The device of claim 3 wherein at least one of said plurality of loops is non-concentric with another of said loops.

5. The device of claim 3 wherein said first and second loops have disposed therethrough arcuately curved first and second bores, respectively.

6. The device of claim 3 wherein said first and second loops are spaced longitudinally apart from one another.

7. The device of claim 6 wherein at least portions of outer wall surfaces of said first and second loops are non-parallel to one another.

8. The device of claim 7 wherein at least one of said first and second loops has starting and ending portions which are non-parallel to one another.

9. The device of claim 8 wherein at least one of said first and second loops has a spiral shape.

10. The device of claim 9 wherein at least one of said first and second loops has a positive helix-angle starting portion and a negative helix-angle ending portion.

11. An anti-slosh device for reducing the duration and amplitude of oscillations of liquid in a tank, said device consisting of:
  a. a single longitudinally elongated unitary web of thin, flexible material formed into a three-dimensional shape having first and second closed end loops and no more than one center loop between said end loops, each of said loops having inner and outer flow-impeding surfaces, no part of said web penetrating any other part of said web.

12. The device of claim 11 further comprising a third, center loop located between said first and second end loops.

13. The device of claim 12 wherein said center loop is obliquely angled with respect to said first and second end loops.

14. The device of claim 12 wherein said strip of material has a generally rectangular shape.

15. The device of claim 14 wherein said strip of material has a generally uniform thickness.

16. The device of claim 15 wherein said material is further defined as being at least partly composed of a synthetic polymer.

17. The device of claim 15 wherein said material is further defined as being at least partly composed of polyethylene.

18. The device of claim 11 wherein said web has an elongated rectangular shape.

19. The device of claim 18 wherein said web has a uniform width.

20. The device of claim 18 wherein said web has a uniform thickness.

21. The device of claim 18 wherein said web has a uniform transverse cross-section.

22. The device of claim 11 wherein said web has a thickness of 0.125 inch.

23. An anti-slosh device for reducing the duration and amplitude of oscillations of liquid in a tank, said device consisting of; an elongated, uniform-width, rectangular strip of material having a first, starting portion extending longitudinally outwards from a first transverse end to form a first end loop having flow-impeding inner and outer surfaces, said strip extending longitudinally inwards and past said first transverse end to form a second end loop having flow-impeding inner and outer surfaces, and said strip having a second, finishing portion extending longitudinally inwards from said second end loop towards said first transverse end, said finishing portion of said strip having a second transverse end and being fastened in a parallel stacked arrangement to said first starting portion, with said first and second transverse ends proximate one another, no part of said strip penetrating any other part of said strip.

24. The device of claim 23 wherein said first and second loops are symmetrical in size and shape.

25. The device of claim 24 wherein said first and second loops have central longitudinal axes which are obliquely angled with respect to one another.

26. The device of claim 25 further including a third loop having flow-impeding inner and outer surfaces, located between said first and second end loops, said third loop being formed from an intermediate longitudinal portion of said strip located between said starting and finishing portions of said strip.

\* \* \* \* \*